United States Patent
Lin

(10) Patent No.: US 11,501,416 B2
(45) Date of Patent: Nov. 15, 2022

(54) IMAGE PROCESSING METHOD AND IMAGE PROCESSING CIRCUIT CAPABLE OF SMOOTHING FALSE CONTOURING WITHOUT USING LOW-PASS FILTERING

(71) Applicant: Realtek Semiconductor Corp., HsinChu (TW)

(72) Inventor: Hsin-Cheng Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 239 days.

(21) Appl. No.: 17/110,245

(22) Filed: Dec. 2, 2020

(65) Prior Publication Data
US 2021/0327035 A1 Oct. 21, 2021

(30) Foreign Application Priority Data
Apr. 16, 2020 (TW) .................................. 109112749

(51) Int. Cl.
| | |
|---|---|
| G06T 5/00 | (2006.01) |
| G06T 9/00 | (2006.01) |
| G06K 9/62 | (2022.01) |
| G06T 7/90 | (2017.01) |

(52) U.S. Cl.
CPC ............ *G06T 5/005* (2013.01); *G06K 9/6267* (2013.01); *G06T 7/90* (2017.01); *G06T 9/00* (2013.01)

(58) Field of Classification Search
CPC .. G06T 5/005; G06T 7/90; G06T 9/00; G06K 9/6267; H04N 19/186; H04N 19/86
See application file for complete search history.

(56) References Cited

U.S. PATENT DOCUMENTS

| | | | | |
|---|---|---|---|---|
| 2006/0104535 A1* | 5/2006 | Varekamp | ................ | G06T 7/12 |
| | | | | 382/275 |
| 2006/0269159 A1* | 11/2006 | Kim | ....................... | G06T 5/002 |
| | | | | 382/256 |
| 2007/0286515 A1* | 12/2007 | Kim | ..................... | H04N 19/154 |
| | | | | 382/254 |

(Continued)

FOREIGN PATENT DOCUMENTS

| | | |
|---|---|---|
| CN | 101778297 A | 7/2010 |
| CN | 102147916 A | 8/2011 |

(Continued)

*Primary Examiner* — John B Strege
(74) *Attorney, Agent, or Firm* — Winston Hsu

(57) ABSTRACT

An image processing method includes: receiving specific data of an image component of input image for a specific color encoding channel wherein the specific data of the image component is formed by the image component's multiple raw values having identical image characteristics; spatially classifying pixel units within the input image into a plurality of blocks according to a specific block size; for each block, obtaining values of the image component of pixel units within each block to calculate the average value of the image component of the each block; generating interpolated values of the image component of an interpolated image according to values of the image component corresponding to the plurality of blocks; and, blending the interpolated values of the image component of the interpolated image with original/raw values of the image component of the input image to generate an output image having modified values of the image component.

18 Claims, 4 Drawing Sheets

(56) References Cited

U.S. PATENT DOCUMENTS

| | | | | |
|---|---|---|---|---|
| 2008/0069217 A1* | 3/2008 | Minami | ............... | H04N 7/0137 375/240.15 |
| 2009/0060375 A1* | 3/2009 | Lim | ..................... | H04N 19/182 382/199 |
| 2017/0053176 A1* | 2/2017 | Yang | .......................... | G06T 5/20 |
| 2017/0053177 A1* | 2/2017 | Yang | ...................... | G06V 10/44 |
| 2017/0208345 A1* | 7/2017 | Jeong | ..................... | H04N 19/70 |
| 2017/0365042 A1* | 12/2017 | Takasumi | ................ | G06T 5/007 |

FOREIGN PATENT DOCUMENTS

| | | |
|---|---|---|
| TW | 201519160 A | 5/2015 |
| TW | I575503 | 3/2017 |
| TW | I575504 | 3/2017 |

\* cited by examiner

IMAGE PROCESSING METHOD AND IMAGE PROCESSING CIRCUIT CAPABLE OF SMOOTHING FALSE CONTOURING WITHOUT USING LOW-PASS FILTERING

BACKGROUND OF THE INVENTION

1. Field of the Invention

The invention relates to an image processing mechanism, and more particularly to an image processing method and an image processing circuit.

2. Description of the Prior Art

Generally speaking, when an input image is compressed and encoded, the generated false contouring effect may make human eyes perceive or notice the artifacts of contour lines since the conventional image quantization processing may convert smoothed image/color regions of a raw image into an image with staircase-shaped image/color bands.

To remove the false contouring effect, a conventional and existing method may perform a false contouring detection to execute an operation of low-pass filtering upon the detected false contouring images so as to smooth the false contouring images. When the conventional method is implemented as a hardware circuit, it is necessary for the conventional hardware circuit to simultaneously retrieve or obtain the image data of all pixels of the regions which to be filtered. Thus, the conventional hardware circuit needs to use and occupy a larger storage space. For example, the conventional hardware circuit needs using and occupying a larger amount of flip-flops, static random access memories, line buffers, and so on. Since the hardware resource is limited, the conventional hardware circuit usually is implemented as a low-cost circuit with the sacrifice of a significant portion of the region which is to be processed by low-pass filtering. Thus, the conventional method usually leads to an insufficient performance result of smoothing false contouring images, and the false contouring effect may not be completely smoothed or removed.

SUMMARY OF THE INVENTION

Therefore, one of the objectives of the invention is to provide an image processing circuit/apparatus and method to solve the above-mentioned problems.

According to embodiments of the invention, an image processing method is disclosed. The image processing method comprises: receiving specific data of an image component of an input image picture transmitted via a specific color encoding channel, the specific data of the image component of the input image picture is formed by the image component's multiple raw values having identical image characteristics; spatially classifying a plurality of pixel units of the input image picture into a plurality of blocks according to a specific block size; for each block, obtaining a plurality of values of the image component corresponding to a plurality of pixel units of the each block from the specific data of the image component to calculate an average value of the image component corresponding to the each block; generating multiple values of the image component of an interpolated image picture according to a plurality of average values of the image component corresponding to the plurality of blocks; and, blending the multiple values of the image component of the interpolated image picture with the multiple raw values of the image component of the input image picture to generate multiple modified values of the image component of an output image picture.

According to the embodiments, an image processing circuit is disclosed. The image processing circuit comprises a receiving circuit and a processing circuit. The receiving circuit is used for receiving specific data of an image component of an input image picture transmitted via a specific color encoding channel wherein the specific data of the image component is formed by the image component's raw values having identical image characteristics. The processing circuit is coupled to the receiving circuit, and is configured for: spatially classifying a plurality of pixel units of the input image picture into a plurality of blocks according to a specific block size; for each block, obtaining a plurality of values of the image component corresponding to a plurality of pixel units of the each block from the specific data of the image component to calculate an average value of the image component of the each block; generating multiple values of the image component of an interpolated image picture according to a plurality of average values of the image component corresponding to the plurality of blocks; and, blending the multiple values of the image component of the interpolated image picture with the multiple raw values of the image component of the input image picture to generate multiple modified values of the image component of an output image picture.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a block-based and large range image processing (smoothing) method to obtain a more smoothed image result. The method is arranged to perform a statistic operation upon data of an input image picture in a fixed size of a block. The method is arranged to simplify data the input image to generate an image feature value for each of the blocks in the input image and then to interpolate an image value of each pixel by using the image feature value(s) of one or more adjacent blocks surrounding the position of the each pixel as an image smoothed result of the each pixel. For implementation by using the hardware circuits, this method in practice can significantly simplify or reduce the amount of data computation, and thus the conventional operation of performing filtering upon data of a larger image range can be saved and the hardware resources can be utilized more efficiently.

In practice, the image feature value of each block for example can be an average value of the image values of multiple pixel units within the each block or can be a corresponding weighted average value. In addition, the image feature value of a block can also comprise (but not limited) an average value of luminance (or chrominance, color intensity) of the block, an maximum value of luminance (or chrominance, color intensity) of the block, a minimum value of luminance (or chrominance, color intensity) of the block, the histogram of luminance distribution of the block, or any combination of above values, and so on. For each block, the method is to use the statistic data to calculate a set of the image feature values of luminance, chrominance, and color intensity of the each block as the representative value of the each block. Then, the method is to perform the spatial interpolation computation based on image features of multiple blocks to derive the smoothed pixel value of each pixel unit, and finally is arranged to perform image blending upon the input image picture and the smoothed image result to generate and obtain an output image picture without false contouring. Accordingly, it is not necessary and needed for the block-based and large range image processing (smoothing) method, provided in the invention, to obtain or retrieve all pixel data of a filtered image range, and thus for the hardware resources the large amount of flip-flops, static random access memories, and line buffers are not needed to be used.

In the description of the following embodiments, the image feature value of each block is represented by calculating and using an average value or a weighted average value. However, this is not intended to be a limitation of the invention, and other different values in statistics can be used to represent the image feature value of each block.

Figure 1:
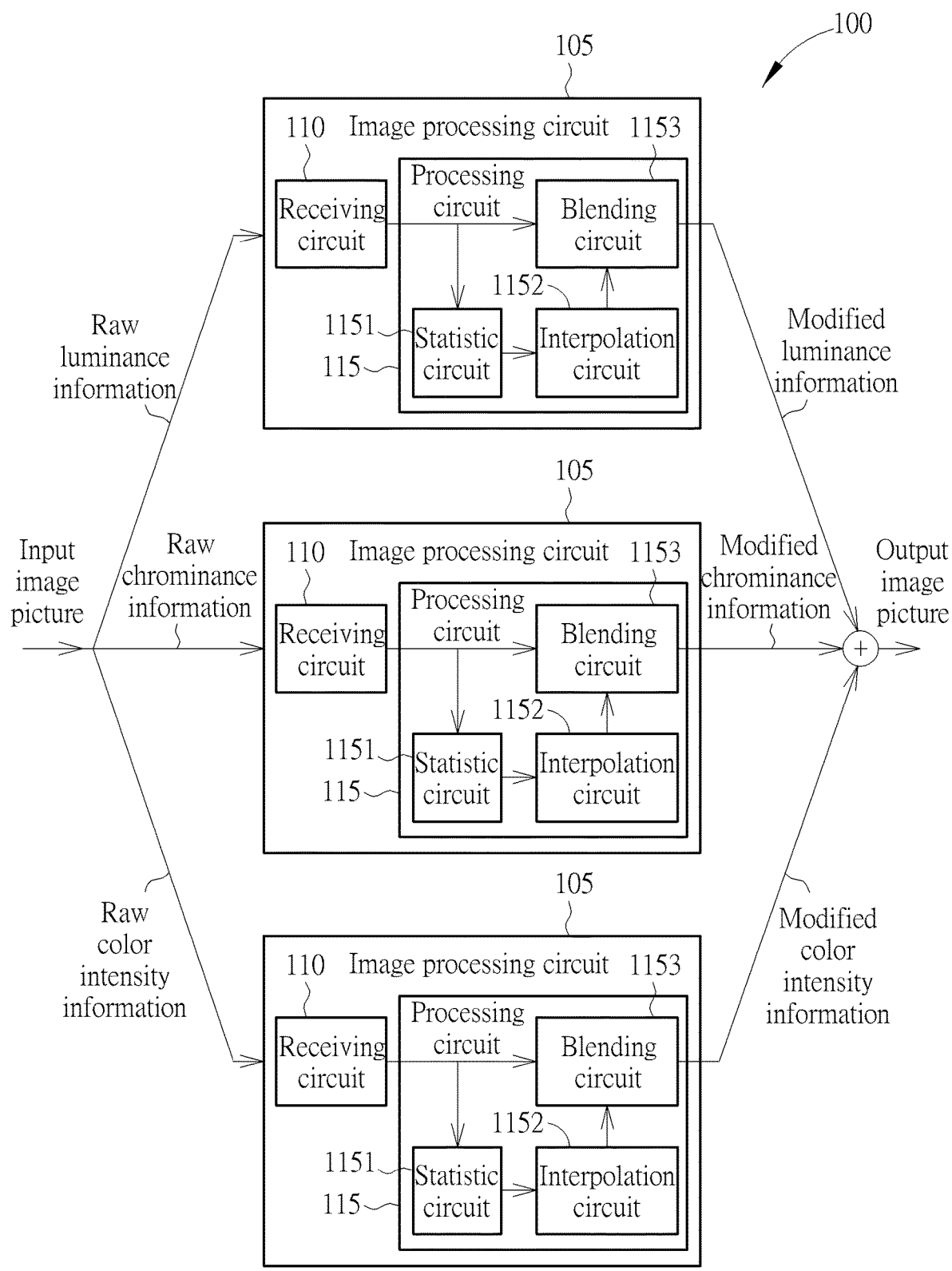
FIG. 1 is a block diagram of an image processing circuit according to one embodiment of the invention.

FIG. 1 is a block diagram of an image processing apparatus 100 according to one embodiment of the invention. The image processing apparatus 100 for example is used as a television chip device (but not limited) and is used for processing compressed image data (but not limited) and is used to smooth, reduce, or remove false contouring, which may be perceived by human eyes, in one or more images and/or used to reduce image flicker which is suddenly generated. The image data comprises multiple image frames or pictures. Each frame or picture comprises and is formed by image values of multiple pixel units. The image value of each pixel unit for example is represented by a specific color encoding format, which may be referred to as a color space or a color model, e.g. YUV encoding format wherein the value of Y indicates the color brightness information (i.e. luminance or gray-level value), the value of U indicates the color chrominance information, and the value of V indicates color intensity information. Alternatively, the image value may be represented by the RGB encoding format wherein the values of R, G, and B respectively indicate color information of red, green, and blue. This is not intended to be a limitation of the invention. The invention can also employ other different color encoding formats such as YCbCr, YPbPr, and so on.

In the embodiment of FIG. 1, the image processing apparatus 100 is used for processing image picture(s) of YUV color encoding format. The image processing apparatus 100 is arranged to respectively and individually process luminance information, chrominance information, and color intensity information comprised in each image picture. The image processing apparatus 100 is used to separate the color luminance information, color chrominance information, and color intensity information comprised in each image picture into the Y encoding channel, U encoding channel, and V encoding channel, respectively. The image processing apparatus 100 includes multiple image processing circuits 105 wherein the image processing circuits 105 can be respectively disposed in different channels such as the Y encoding channel, U encoding channel, and V encoding channel of YUV encoding format to respectively process luminance information, chrominance information, and color intensity information of the image value of each pixel unit in each input image picture. As shown in FIG. 1, the image processing apparatus 100 employs three image processing circuits 105 to respectively and individually process luminance information, chrominance information, and color intensity information of the image value of each pixel unit in each input image picture, to reduce, remove, or smooth false contouring in the each input image picture. It should be noted that, in this embodiment, to significantly reduce the false contouring of image picture(s), the image processing apparatus 100 enables or activates the operations of the three image processing circuits 105 to smooth the false contouring respectively for luminance information, chrominance information, and color intensity information of each image picture. In other embodiments, the image processing apparatus 100 may activates only one or two image processing circuits 105 to process information of different image components (i.e. luminance component, chrominance component, and color intensity component) of each image value. This can also reduce partial false contouring. The image processing apparatus 100 for example may select to activate only the image processing circuit 105 of the Y encoding channel to smooth only the luminance information of the image pictures and does not process chrominance information and color intensity information. One of the advantages is that it can reduce the computation loading. However, this is not intended to be a limitation of the invention. Further, when one image processing circuit 105 is not enabled or activated, this indicates that such image processing circuit 105 is arranged to directly output the received information of an image component without further processing the received information.

In the following, the image processing circuit 105 used for processing the luminance information is taken as an example for illustration (but not limited); the operation is similar to that operations of processing information of other different image components (chrominance component and color intensity component) of an image value. The image processing circuit 105 comprises the receiving circuit 110 and the processing circuit 115. For processing luminance information, the receiving circuit 110 is used for receiving input image data transmitted via an encoding channel such as Y encoding channel of a specific color encoding format such as YUV encoding format. The input image data comprises brightness/luminance values of multiple image values of multiple pixel units of one or more image pictures. The processing circuit 115 is coupled to the receiving circuit 110 and is used for spatially dividing or classifying the size of a full image picture into multiple blocks according to a specific block size wherein each block for example may have N×N pixel units. For example, a 4K-quality image picture may be divided or classified into 96×54 blocks if the block size is configured to have 40×40 pixel units. However, this is not intended to be a limitation of the invention.

In practice, the processing circuit 115 comprises a statistic circuit 1151, an interpolation circuit 1152, and a blending circuit 1153. For each block, the statistic circuit 1151 of the processing circuit 115 is arranged to accumulate and then perform averaging upon N×N luminance values of N×N pixel units of the each block to generate an luminance average value of the each block so as to accordingly generate 96×54 luminance average values (but not limited); alternatively, in other embodiments, the statistic circuit 1151 may generate a weighted luminance average value for the each block. After generating the luminance average values, the interpolation circuit 1152 of the processing circuit 115 is arranged to generate an interpolated luminance value of each pixel unit within each of the blocks according to the luminance average values of the blocks, and the blending circuit 1153 is arranged to blend the interpolated luminance value with a raw luminance value to generate a modified luminance value to thereby obtaining a resultant luminance value of a modified image picture. The interpolated luminance value is generated and determined by an average value of a part of a portion of blocks, and the interpolated luminance value will be a blurred image result. The embodiment is to appropriately blend the blurred image result with the raw luminance value to generate the modified luminance value so as to remove false contouring of a portion of image as far as possible and simultaneously retain enough image quality of another portion of image without significant distortion.

In practice, for generating an interpolated luminance value of a specific pixel unit of a specific block, the interpolation circuit 1152 of the processing circuit 115 is used to refer to multiple adjacent blocks (top, bottom, left, and right adjacent blocks) of the surrounding the specific block. For example, the adjacent blocks may be M×M blocks and M for example is equal to five (but not limited). The interpolation circuit 1152 for example is used for calculating to determine multiple interpolation weighted values according to multiple spatial distances of the multiple adjacent blocks surrounding the specific block compared to the specific pixel unit of the specific block. For example, M×M interpolation weighted values are calculated. A corresponding interpolation weighted value becomes larger when a corresponding spatial distance becomes or is smaller, i.e. an adjacent block is closer to the specific pixel unit. Then, the interpolation circuit 1152 correspondingly multiplies the M×M interpolation weighted values respectively with M×M luminance average values of M×M adjacent blocks to interpolate and calculate an interpolated luminance value of the specific pixel unit of the specific block according to the luminance average value of the specific block, multiple luminance average values of the multiple adjacent blocks, and the multiple interpolation weighted values. Then, the blending circuit 1153 determines a blending weighted value according to a raw luminance value of the specific pixel unit of the specific block and the interpolated luminance value of the specific pixel unit of the specific block. The blending circuit 1153 then blends the raw luminance value of the raw image with the interpolated luminance value according to the blending weighted value to generate a resultant luminance value of the specific pixel unit. Accordingly, after performing the above-mentioned processing operations upon each pixel unit of each block in one image picture, the processing circuit 115 can generate luminance values of one modified image picture.

Figure 2:
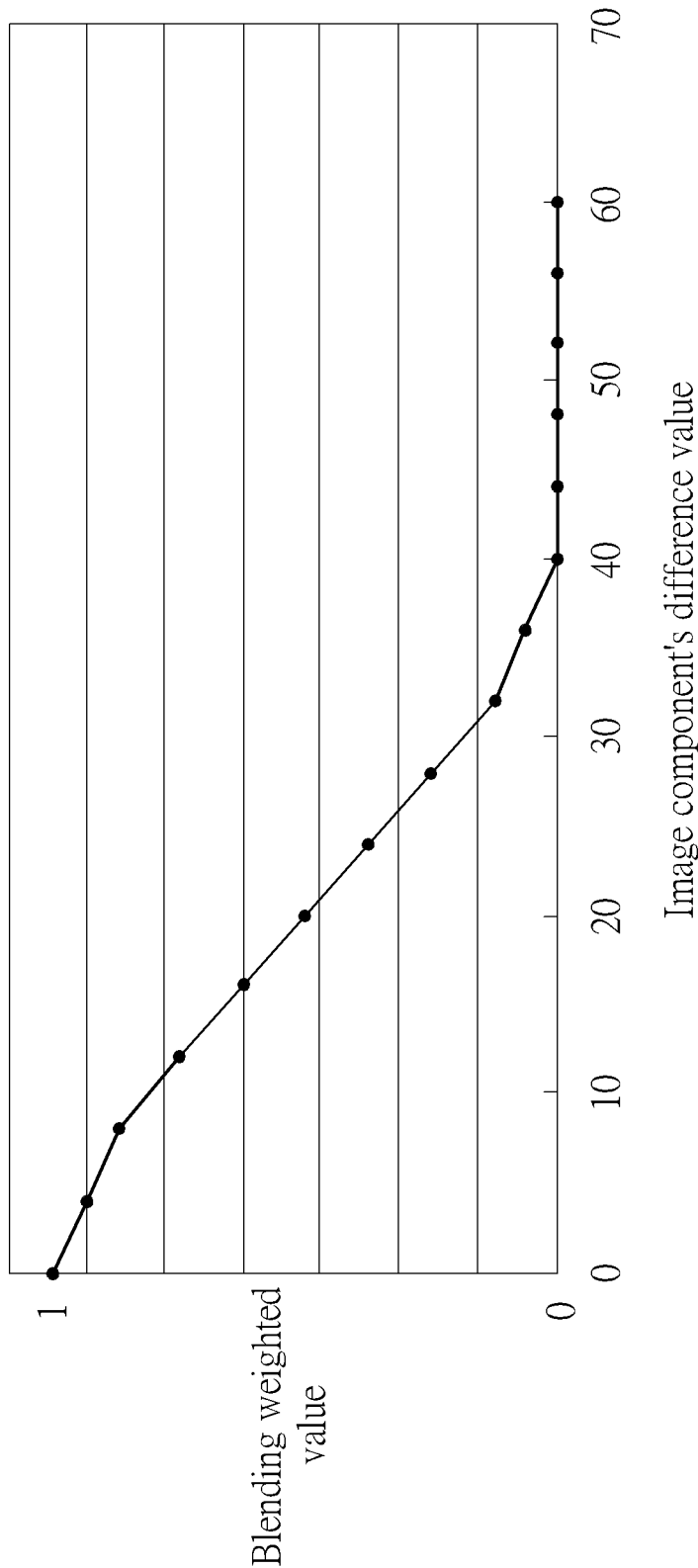
FIG. 2 is a diagram showing an example of a blending weighted curve used by the operation of the blending circuit according to an embodiment of the invention.

For the blending operation, refer to FIG. 2. FIG. 2 is a diagram showing an example of a blending weighted curve used by the operation of the blending circuit 1153 according to an embodiment of the invention. For a specific pixel unit of a specific block, the blending circuit 1153 is arranged to generate a luminance difference by decreasing the raw luminance value of the specific pixel unit with an interpolated luminance value of the specific pixel unit, and then is arranged to determine a blending weighted value by referring to the blending weighted curve shown in FIG. 2. As shown in FIG. 2, the horizontal axis indicates the difference values of one image component such as luminance differences, and the vertical axis indicates the different blending weighted values which for example ranges from zero to one.

When the luminance difference becomes larger, the determined blending weighted value becomes smaller so as to make a smaller proportion of a modified luminance value, resultantly generated, be contributed or determined by the interpolated luminance value. That is, a larger proportion of the modified luminance value is contributed or determined by the luminance value of the raw image. Instead, when the luminance difference becomes smaller, the determined blending weighted value becomes larger so as to make a larger proportion of the modified luminance value, resultantly generated, be contributed or determined by the interpolated luminance value. That is, a smaller proportion of the modified luminance value is contributed or determined by the luminance value of the raw image. For instance, the modified luminance value $Y_{decont}$ can be represented by the following equation:

$$Y_{decont} = \alpha_1 \times Y_{int} + (1-\alpha_1) \times Y_{raw}$$

wherein $\alpha_1$ is the blending weighted value, $Y_{int}$ is the interpolated luminance value, and $Y_{raw}$ is the luminance value of the raw image. That is, equivalently, when the luminance difference is smaller, the processing circuit 115 is arranged to perform the false contouring smoothing operation to a large extent; when the luminance difference is larger, the processing circuit 115 performs the false contouring smoothing operation to a small extent so as to avoid smoothing the true image edge(s) of the images.

For processing luminance information, the receiving circuit 110 is used for receiving input image data transmitted via an encoding channel such as Y encoding channel of a specific color encoding format such as YUV encoding format. The input image data comprises brightness/luminance values of multiple image values of multiple pixel units of one or more image pictures. The processing circuit 115 is coupled to the receiving circuit 110 and is used for spatially dividing or classifying the size of a full image picture into multiple blocks according to a specific block size wherein each block for example may have N×N pixel units. For example, a 4K-quality image picture may be divided or classified into 96×54 blocks if the block size is configured to have 40×40 pixel units. However, this is not intended to be a limitation of the invention.

Further, for generating a luminance average value of the specific block, in one embodiment, the statistic circuit 1151 of processing circuit 115 may determine the luminance average value of the specific block by further referring to a luminance average value of a block located at the same spatial position (corresponding to the specific block) and within the previous image picture. For example, in order to avoid the significant luminance difference between two consecutive image pictures in temporal, the statistic circuit 1151 can refer to a luminance average value of a block located at the same spatial position (corresponding to the specific block) in the previous image picture to determine a first threshold value TH1 such as an upper limit value. When the calculated luminance average value of the specific block is larger than the first threshold value TH1, the statistic circuit 1151 is arranged to directly use the first threshold value TH1 as a resultant luminance average value of the specific block. Alternatively, in one embodiment, the statistic circuit 1151 may refer to the luminance average value of the block, located at the same spatial position (corresponding to the specific block) and within the previous image picture, to determine a second threshold value TH2 such as a lower limit value. When the calculated luminance average value of the specific block is smaller than the second threshold value TH2, the statistic circuit 1151 is arranged to directly use the second threshold value TH2 as a resultant luminance average value of the specific block. That is, when deciding a luminance average value of a specific block of a current image picture, the processing circuit 115 can refer to the luminance of a previous image picture to appropriately correct the decided luminance average value to make the luminance difference between two images (previous image and current image) not become too large so as to avoid image flickers.

Further, for processing chrominance information of image component U, for a second image processing circuit 105, its receiving circuit 110 is used for receiving input image data transmitted via an encoding channel such as U encoding channel of YUV encoding format. The input image data comprises chrominance values of multiple image values of multiple pixel units of one or more image pictures. The processing circuit 115 is coupled to the receiving circuit 110 and is used for spatially dividing or classifying the size of a full image picture into multiple blocks according to a specific block size wherein each block for example may have N×N pixel units. For example, a 4K-quality image picture may be divided or classified into 96×54 blocks if the block size is configured to have 40×40 pixel units. However, this is not intended to be a limitation of the invention.

In practice, the statistic circuit 1151 of the processing circuit 115 is arranged to accumulate and then perform averaging upon N×N chrominance values of N×N pixel units of the each block to generate a chrominance average value of the each block so as to accordingly generate 96×54 chrominance average values (but not limited); alternatively, in other embodiments, the statistic circuit 1151 may generate a weighted chrominance average value for the each block. After generating the chrominance average values, the interpolation circuit 1152 of the processing circuit 115 is arranged to generate an interpolated chrominance value of each pixel unit within each of the blocks according to the chrominance average values of the blocks, and the blending circuit 1153 is arranged to blend the interpolated chrominance value with a raw chrominance value to generate a modified chrominance value to thereby obtaining a resultant chrominance value of a modified image picture. The interpolated chrominance value is generated and determined by an average value of a part of a portion of blocks, and the interpolated chrominance value will be a blurred image result. The embodiment is to appropriately blend the blurred image result with the raw chrominance value to generate the modified chrominance value so as to remove false contouring of a portion of image as far as possible and simultaneously retain enough image quality of another portion of image without significant distortion.

In practice, for generating an interpolated chrominance value of a specific pixel unit of a specific block, the interpolation circuit 1152 of the processing circuit 115 is used to refer to multiple adjacent blocks (top, bottom, left, and right adjacent blocks) which surround the specific block. For example, the adjacent blocks may be M×M blocks and M for example is equal to five (but not limited). The interpolation circuit 1152 for example is used for calculating to determine multiple interpolation weighted values according to multiple spatial distances of the multiple adjacent blocks surrounding the specific block compared to the specific pixel unit of the specific block. For example, M×M interpolation weighted values are calculated. A corresponding interpolation weighted value becomes larger when a corresponding spatial distance becomes or is smaller, i.e. an adjacent block is closer to the specific pixel unit. Then, the interpolation circuit 1152 correspondingly multiplies the M×M interpolation weighted values respectively with M×M chrominance average values of M×M adjacent blocks to interpolate and calculate an interpolated chrominance value of the specific pixel unit of the specific block according to the chrominance average value of the specific block, multiple chrominance average values of the multiple adjacent blocks, and the multiple interpolation weighted values. Then, the blending circuit 1153 determines a blending weighted value according to a raw chrominance value of the specific pixel unit of the specific block and the interpolated chrominance value of the specific pixel unit of the specific block. The blending circuit 1153 then blends the raw chrominance value of the raw image with the interpolated chrominance value according to the blending weighted value to generate a resultant chrominance value of the specific pixel unit. Accordingly, after performing the above-mentioned processing operations upon each pixel unit of each block in one image picture, the processing circuit 115 can generate chrominance values of one modified image picture.

Similarly, for the blending operation, for a specific pixel unit of a specific block, the blending circuit 1153 is arranged to generate a chrominance difference by decreasing the raw chrominance value of the specific pixel unit with an interpolated chrominance value of the specific pixel unit, and then similarly is arranged to determine a blending weighted value by referring to the blending weighted curve shown in FIG. 2. When the chrominance difference becomes larger, the determined blending weighted value becomes smaller so as to make a smaller proportion of a modified chrominance value, resultantly generated, be contributed or determined by the interpolated chrominance value. That is, a larger proportion of the modified chrominance value is contributed or determined by the chrominance value of the raw image. Instead, when the chrominance difference becomes smaller, the determined blending weighted value becomes larger so as to make a larger proportion of the modified chrominance value, resultantly generated, be contributed or determined by the interpolated chrominance value. That is, a smaller proportion of the modified luminance value is contributed or determined by the chrominance value of the raw image. For instance, the modified chrominance value $U_{decont}$ can be represented by the following equation:

$$U_{decont} = \alpha_2 \times U_{int} + (1-\alpha_2) \times U_{raw}$$

wherein $\alpha_2$ is the blending weighted value, $U_{int}$ is the interpolated chrominance value, and $U_{raw}$ is the chrominance value of the raw image. That is, equivalently, when the chrominance difference is smaller, the processing circuit 115 is arranged to perform the false contouring smoothing operation to a large extent; when the chrominance difference is larger, the processing circuit 115 performs the false contouring smoothing operation to a small extent so as to avoid smoothing the true image edge(s) of the images.

Further, for generating a chrominance average value of the specific block, in one embodiment, the statistic circuit 1151 of processing circuit 115 may determine the chrominance average value of the specific block by further referring to a chrominance average value of a block located at the same spatial position (corresponding to the specific block) and within the previous image picture. For example, in order to avoid the significant chrominance difference between two consecutive image pictures in temporal, the statistic circuit 1151 can refer to a chrominance average value of a block located at the same spatial position (corresponding to the specific block) in the previous image picture to determine a third threshold value TH3 such as an upper limit value. When the calculated chrominance average value of the specific block is larger than the third threshold value TH3, the statistic circuit 1151 is arranged to directly use the third threshold value TH3 as a resultant chrominance average value of the specific block. Alternatively, in one embodiment, the statistic circuit 1151 may refer to the chrominance average value of the block, located at the same spatial position (corresponding to the specific block) and within the previous image picture, to determine a fourth threshold value TH4 such as a lower limit value. When the calculated chrominance average value of the specific block is smaller than the fourth threshold value TH4, the statistic circuit 1151 is arranged to directly use the fourth threshold value TH4 as a resultant chrominance average value of the specific block. That is, when deciding a chrominance average value of a specific block of a current image picture, the processing circuit 115 can refer to the chrominance information of a previous image picture to appropriately correct the decided chrominance average value to make the chrominance difference between two images (previous image and current image) not become too large so as to avoid image flickers.

Further, for processing color intensity information of image component V, for a third image processing circuit 105, its receiving circuit 110 is used for receiving input image data transmitted via an encoding channel such as V encoding channel of YUV encoding format. The input image data comprises color intensity values of multiple image values of multiple pixel units of one or more image pictures. The processing circuit 115 is coupled to the receiving circuit 110 and is used for spatially dividing or classifying the size of a full image picture into multiple blocks according to a specific block size wherein each block for example may have N×N pixel units. For example, a 4K-quality image picture may be divided or classified into 96×54 blocks if the block size is configured to have 40×40 pixel units. However, this is not intended to be a limitation of the invention.

In practice, the statistic circuit 1151 of the processing circuit 115 is arranged to accumulate and then perform averaging upon N×N color intensity values of N×N pixel units of the each block to generate a color intensity average value of the each block so as to accordingly generate 96×54 color intensity average values (but not limited); alternatively, in other embodiments, the statistic circuit 1151 may generate a weighted color intensity average value for the each block. After generating the color intensity average values, the interpolation circuit 1152 of the processing circuit 115 is arranged to generate an interpolated color intensity value of each pixel unit within each of the blocks according to the color intensity average values of the blocks, and the blending circuit 1153 is arranged to blend the interpolated color intensity value with a raw color intensity value to generate a modified color intensity value to thereby obtaining a resultant color intensity value of a modified image picture. The interpolated color intensity value is generated and determined by an average of a part of a portion of blocks, and the interpolated color intensity value will be a blurred image result. The embodiment is to appropriately blend the blurred image result with the raw color intensity value to generate the modified color intensity value so as to remove false contouring of a portion of image as far as possible and simultaneously retain enough image quality of another portion of image without significant distortion.

In practice, for generating an interpolated color intensity value of a specific pixel unit of a specific block, the interpolation circuit 1152 of the processing circuit 115 is used to refer to multiple adjacent blocks (top, bottom, left, and right adjacent blocks) which surround the specific block. For example, the adjacent blocks may be M×M blocks and M for example is equal to five (but not limited). The interpolation circuit 1152 for example is used for calculating to determine multiple interpolation weighted values according to multiple spatial distances of the multiple adjacent blocks surrounding the specific block compared to the specific pixel unit of the specific block. For example, M×M interpolation weighted values are calculated. A corresponding interpolation weighted value becomes larger when a corresponding spatial distance becomes or is smaller, i.e. an adjacent block is closer to the specific pixel unit. Then, the interpolation circuit 1152 correspondingly multiplies the M×M interpolation weighted values respectively with M×M color intensity average values of M×M adjacent blocks to interpolate and calculate an interpolated color intensity value of the specific pixel unit of the specific block according to the color intensity average value of the specific block, multiple color intensity average values of the multiple adjacent blocks, and the multiple interpolation weighted values. Then, the blending circuit 1153 determines a blending weighted value according to a raw color intensity value of the specific pixel unit of the specific block and the interpolated color intensity value of the specific pixel unit of the specific block. The blending circuit 1153 then blends the raw color intensity value of the raw image with the interpolated color intensity value according to the blending weighted value to generate a resultant color intensity value of the specific pixel unit. Accordingly, after performing the above-mentioned processing operations upon each pixel unit of each block in one image picture, the processing circuit 115 can generate color intensity values of one modified image picture.

Similarly, for the blending operation, for a specific pixel unit of a specific block, the blending circuit 1153 is arranged to generate a color intensity difference by decreasing the raw color intensity value of the specific pixel unit with an interpolated color intensity value of the specific pixel unit, and then similarly is arranged to determine a blending weighted value by referring to the blending weighted curve shown in FIG. 2. When the color intensity difference becomes larger, the determined blending weighted value becomes smaller so as to make a smaller proportion of a modified color intensity value, resultantly generated, be contributed or determined by the interpolated color intensity value. That is, a larger proportion of the modified color intensity value is contributed or determined by the color intensity value of the raw image. Instead, when the color intensity difference becomes smaller, the determined blending weighted value becomes larger so as to make a larger proportion of the modified color intensity value, resultantly generated, be contributed or determined by the interpolated color intensity value. That is, a smaller proportion of the modified luminance value is contributed or determined by the color intensity value of the raw image. For instance, the modified color intensity value $V_{decont}$ can be represented by the following equation:

$$V_{decont} = \alpha_3 \times V_{int} + (1-\alpha_3) \times V_{raw}$$

wherein $\alpha_3$ is the blending weighted value, $V_{int}$ is the interpolated color intensity value, and $V_{raw}$ is the color intensity value of the raw image. That is, equivalently, when the color intensity difference is smaller, the processing circuit 115 is arranged to perform the false contouring smoothing operation to a large extent; when the color intensity difference is larger, the processing circuit 115 performs the false contouring smoothing operation to a small extent so as to avoid smoothing the true image edge(s) of the images.

Further, for generating a color intensity average value of the specific block, in one embodiment, the statistic circuit 1151 of processing circuit 115 may determine the color intensity average value of the specific block by further referring to a color intensity average value of a block located at the same spatial position (corresponding to the specific block) and within the previous image picture. For example, in order to avoid the significant color intensity difference between two consecutive image pictures in temporal, the statistic circuit 1151 can refer to a color intensity average value of a block located at the same spatial position (corresponding to the specific block) in the previous image picture to determine a fifth threshold value TH5 such as an upper limit value. When the calculated color intensity average value of the specific block is larger than the fifth threshold value TH5, the statistic circuit 1151 is arranged to directly use the fifth threshold value TH5 as a resultant color intensity average value of the specific block. Alternatively, in one embodiment, the statistic circuit 1151 may refer to the color intensity average value of the block, located at the same spatial position (corresponding to the specific block) and within the previous image picture, to determine a sixth threshold value TH6 such as a lower limit value. When the calculated color intensity average value of the specific block is smaller than the sixth threshold value TH6, the statistic circuit 1151 is arranged to directly use the sixth threshold value TH6 as a resultant color intensity average value of the specific block. That is, when deciding a color intensity average value of a specific block of a current image picture, the processing circuit 115 can refer to the color intensity information of a previous image picture to appropriately correct the decided color intensity average value to make the color intensity difference between two images (previous image and current image) not become too large so as to avoid image flickers.

It should be noted that the values of the above-mentioned upper limit values can be identical or can be different from each other, and the values of the above-mentioned lower limit values can be identical or can be different from each other. All these values can be dynamically adjusted and can be configured based on the different designs of users.

After obtaining the image information/data of the different image components, the image processing apparatus 100 is arranged to combine the image information/data of the different image components to generate a modified image picture to remove false contouring (which may be caused by image compression, but not limited) of a portion of a raw image as far as possible and simultaneously retain enough image quality of another portion of the raw image.

Figure 3:
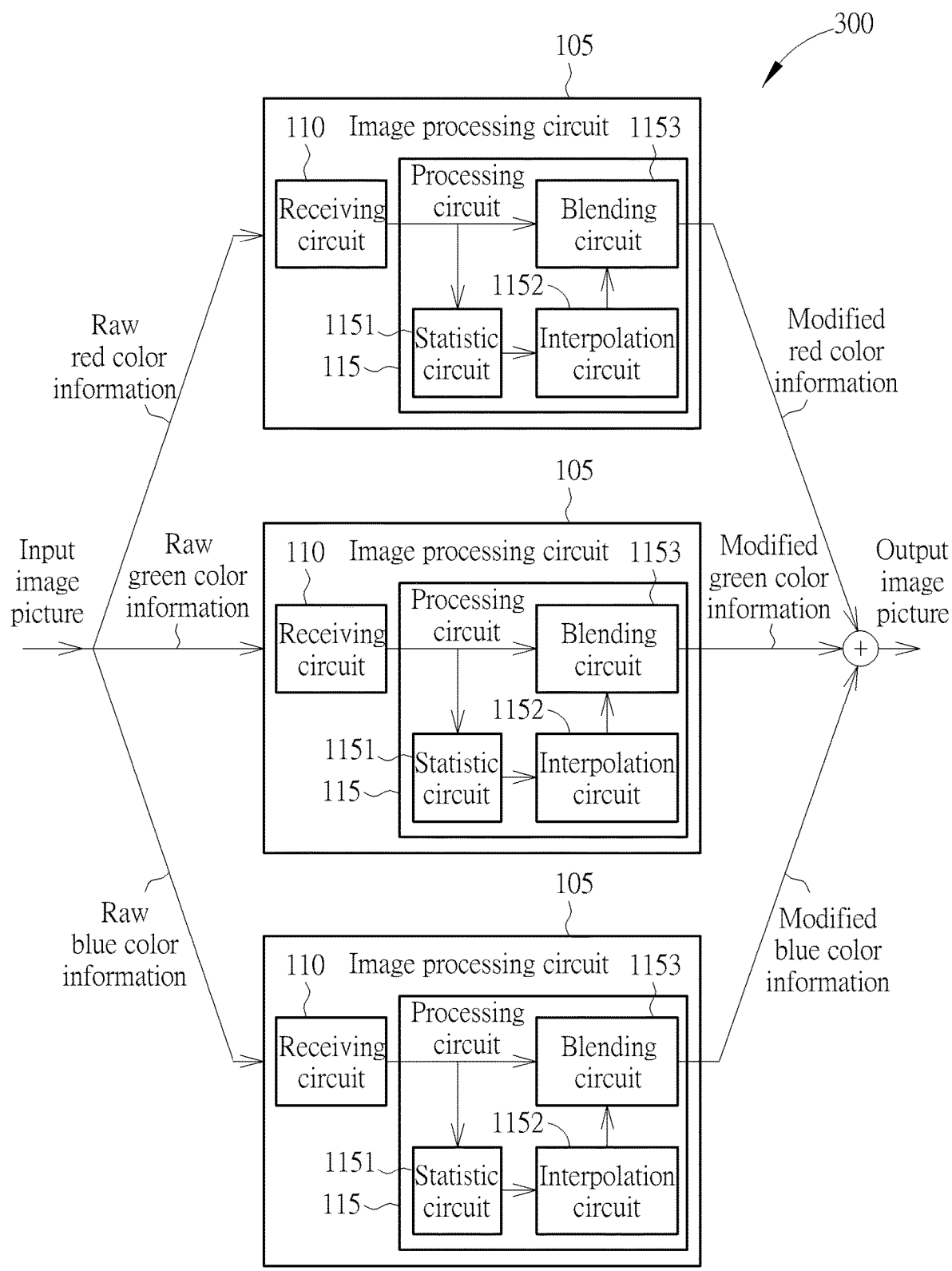
FIG. 3 is a diagram of an image processing circuit according to another embodiment of the invention.

Further, it should be noted that the operations in the embodiments of the invention can be also applied to the RGB color encoding format. Please refer to FIG. 3. FIG. 3 is a diagram of an image processing circuit 300 according to another embodiment of the invention. The image processing circuit 300 for example is used as a television chip device (but not limited) and is used for processing compressed image data (but not limited). The image data comprises multiple image frames, and each frame comprises multiple pixel units. The image value of each pixel unit for example is represented by the RGB color encoding format. The three image processing circuits 105 of image processing circuit 300, respectively disposed and configured in the R encoding channel, G encoding channel, and the B encoding channel, can respectively and individually/independently process the image data of different image components (or referred to as color components) of the RGB encoding format so as to remove false contouring (which may be caused by image compression, but not limited) of a portion of a raw image as far as possible and simultaneously retain enough image quality of another portion of the raw image without significant distortion.

Figure 4:
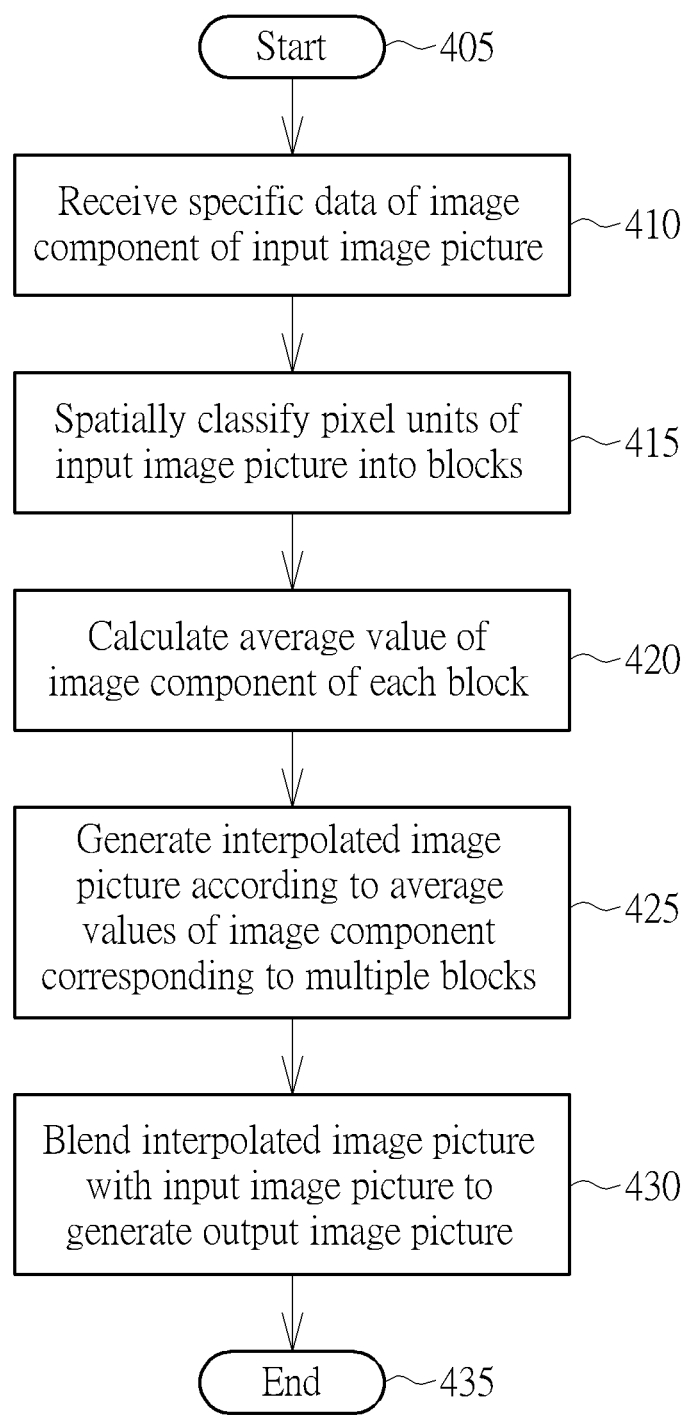
FIG. 4 is a diagram of a flowchart of the image picture processing operation in the embodiments of the invention.

Further, to make a reader more clearly understand the spirits of the invention, FIG. 4 is provided. FIG. 4 is a diagram of a flowchart of the image picture processing operation in the embodiments of the invention. Provided that substantially the same result is achieved, the steps of the flowchart shown in FIG. 4 need not be in the exact order shown and need not be contiguous, that is, other steps can be intermediate. Steps are detailed in the following:

Step 405: Start;

Step 410: Receive specific data of an image component of an input image picture in a specific color encoding channel wherein the specific data of the image component comprises multiple raw values of the image component having identical image characteristics in one or more image pictures;

Step 415: Spatially classify a plurality of pixel units of the input image picture into a plurality of blocks according to a specific block size;

Step 420: For each block, obtain a plurality of values of the image component corresponding to a plurality of pixel units within the each block from the specific data of the image component to calculate an average value of the image component of the each block;

Step 425: Generate multiple values of the image component of an interpolated image picture according to multiple average values of the image component corresponding to the plurality of blocks;

Step 430: Blend multiple values of the image component of the interpolated image picture with the multiple raw values of the image component of the input image picture to generate multiple modified values of the image component of an output image picture; and Step 435: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
receiving specific data of an image component of an input image picture transmitted via a specific color encoding channel, the specific data of the image component of the input image picture is formed by the image component's multiple raw values having identical image characteristics;
spatially classifying a plurality of pixel units of the input image picture into a plurality of blocks according to a specific block size;
for each block, obtaining a plurality of values of the image component corresponding to a plurality of pixel units of the each block from the specific data of the image component to calculate an average value of the image component corresponding to the each block;
generating multiple values of the image component of an interpolated image picture according to a plurality of average values of the image component corresponding to the plurality of blocks; and
blending the multiple values of the image component of the interpolated image picture with the multiple raw values of the image component of the input image picture to generate multiple modified values of the image component of an output image picture.

2. The image processing method of claim 1, wherein the step of generating the multiple values of the image component of the interpolated image picture comprises:
for a specific pixel unit of a specific block in the input image picture:
determining a plurality of interpolation weighted values according to spatial distances of a position of the specific pixel unit of the specific block compared to positions of a plurality of adjacent blocks of the specific block;
generating an interpolated value of the image component of the specific pixel unit of the specific block according to an average value of the image component of the specific block, a plurality of average values of the image component corresponding to the plurality of adjacent blocks, and the plurality of interpolation weighted values;
determining a blending weighted value according to a raw value of the image component of the specific pixel unit of the specific block and the interpolated value of the image component of the specific pixel unit of the specific block; and
blending the raw value of the image component with the interpolated value of the image component to generate a modified value of the image component of the specific pixel unit according to the blending weighted value.

3. The image processing method of claim 2, wherein the step of determining the blending weighted value comprises:
calculating a difference of the image component between the raw value of the image component and the interpolated value of the image component; and
determining the blending weighted value according to the calculated difference of the image component.

4. The image processing method of claim 3, wherein when the difference of the image component becomes larger, the blending weighted value becomes smaller so that a larger proportion of the modified value of the image component is contributed by the raw value of the image component; and, when the difference of the image component becomes smaller, the blending weighted value becomes larger so that the larger proportion of the modified value of the image component is contributed by the interpolated value of the image component.

5. The image processing method of claim 1, wherein the specific color encoding channel corresponds to one among luminance information, chrominance information, and color intensity information in a YUV color encoding system.

6. The image processing method of claim 1, wherein the specific color encoding channel corresponds to a specific color in an RGB color encoding space.

7. The image processing method of claim 1, wherein the step of calculating the average value of the image component of the each block is performed by further referring to a threshold value and an average value of the image component of a corresponding block corresponding to a same spatial position within a previous input image picture compared to the input image picture, to derive the average value of the image component of the each block of the input image picture.

8. The image processing method of claim 7, further comprising:
for the each block, modifying the average value of the image component of the each block corresponding to the same spatial position within the input image picture as the threshold value when the threshold value is located between the average value of the image component of the corresponding block corresponding to the same spatial position within the previous input image picture and the average value of the image component of the each block corresponding to the same spatial position within the input image picture.

9. The image processing method of claim 8, wherein the threshold value is determined by the average value of the image component of the corresponding block corresponding to the same spatial position within the previous input image picture.

10. An image processing circuit, comprising:
a receiving circuit, configured for receiving specific data of an image component of an input image picture for a specific color encoding channel, the specific data of the image component is formed by the image component's multiple raw values having identical image characteristics; and
a processing circuit, coupled to the receiving circuit, configured for:
spatially classifying a plurality of pixel units of the input image picture into a plurality of blocks according to a specific block size;
for each block, obtaining a plurality of values of the image component corresponding to a plurality of pixel units of the each block from the specific data of the image component to calculate an average value of the image component of the each block;
generating multiple values of the image component of an interpolated image picture according to a plurality of average values of the image component corresponding to the plurality of blocks; and
blending the multiple values of the image component of the interpolated image picture with the multiple raw values of the image component of the input image picture to generate multiple modified values of the image component of an output image picture.

11. The image processing circuit of claim 10, wherein for a specific pixel unit of a specific block in the input image picture, the processing circuit is used for:
determining a plurality of interpolation weighted values according to spatial distances of a position of the specific pixel unit of the specific block compared to positions of a plurality of adjacent blocks of the specific block;
generating an interpolated value of the image component of the specific pixel unit of the specific block according to an average value of the image component of the specific block, a plurality of average values of the image component corresponding to the plurality of adjacent blocks, and the plurality of interpolation weighted values;
determining a blending weighted value according to a raw value of the image component of the specific pixel unit of the specific block and the interpolated value of the image component of the specific pixel unit of the specific block; and
blending the raw value of the image component with the interpolated value of the image component to generate a modified value of the image component of the specific pixel unit according to the blending weighted value.

12. The image processing circuit of claim 11, wherein the processing circuit is used for calculating a difference of the image component between the raw value of the image component and the interpolated value of the image component, and is used for determining the blending weighted value according to the calculated difference of the image component.

13. The image processing circuit of claim 12, wherein when the difference of the image component becomes larger, the processing circuit configures the blending weighted value being smaller so that a larger proportion of the modified value of the image component is contributed by the raw value of the image component; and, when the difference of the image component becomes smaller, the processing circuit configures the blending weighted value being larger so that the larger proportion of the modified value of the image component is contributed by the interpolated value of the image component.

14. The image processing circuit of claim 10, the specific color encoding channel corresponds to one among luminance information, chrominance information, and color intensity information in a YUV color encoding system.

15. The image processing circuit of claim 10, wherein the specific color encoding channel corresponds to a specific color in an RGB color encoding space.

16. The image processing circuit of claim 10, wherein the processing circuit derives the average value of the image component of the each block of the input image picture by further referring to a threshold value and an average value of the image component of a corresponding block corresponding to a same spatial position within a previous input image picture compared to the input image picture.

17. The image processing circuit of claim 16, wherein for the each block, the processing circuit is used for modifying the average value of the image component of the each block corresponding to the same spatial position within the input image picture as the threshold value when the threshold value is located between the average value of the image component of the corresponding block corresponding to the same spatial position within the previous input image picture and the average value of the image component of the each block corresponding to the same spatial position within the input image picture.

18. The image processing circuit of claim 17, wherein the threshold value is determined by the average value of the image component of the corresponding block corresponding to the same spatial position within the previous input image picture.

\* \* \* \* \*